United States Patent
Shiba et al.

(10) Patent No.: US 8,194,686 B2
(45) Date of Patent: Jun. 5, 2012

(54) COMMUNICATIONS RELAY DEVICE, PROGRAM AND METHOD, AND NETWORK SYSTEM

(75) Inventors: Shugo Shiba, Chiba (JP); Masayuki Komiya, Saitama (JP)

(73) Assignee: Oki Networks Co., Ltd., Tokyo (JP)

( * ) Notice: Subject to any disclaimer, the term of this patent is extended or adjusted under 35 U.S.C. 154(b) by 290 days.

(21) Appl. No.: 12/656,082

(22) Filed: Jan. 15, 2010

(65) Prior Publication Data

US 2010/0208734 A1    Aug. 19, 2010

(30) Foreign Application Priority Data

Feb. 17, 2009    (JP) .................................. 2009-034383

(51) Int. Cl.
*H04L 12/28* (2006.01)
*H04L 12/56* (2006.01)

(52) U.S. Cl. ........................................ 370/401; 370/392

(58) Field of Classification Search .................. 370/389, 370/392, 401
See application file for complete search history.

(56) References Cited

U.S. PATENT DOCUMENTS

| | | | |
|---|---|---|---|
| 2003/0033418 A1* | 2/2003 | Young et al. | 709/230 |
| 2005/0180404 A1* | 8/2005 | Kwon | 370/352 |
| 2011/0167154 A1* | 7/2011 | Bush et al. | 709/224 |

OTHER PUBLICATIONS

ITU-T Y.2012, "Supplement 1, Session/border control (S/BC) functions", Jul. 2006.
ITU-T Y.2111 9.2, "Procedures for NAPT control and NAT traversal", Resource and admission control functions in next generation networks, Sep. 2006.
IETF RFC3022, P. Srisuresh et al., "Traditional IP Network Address Translator", Network Working Group, Jan. 2001.
IETF RFC3261, J. Rosenberg et al., "SIP Session Initiation Protocol", Network Working Group, Jun. 2002.
IETF RFC4566, M. Handley et al., "SDP Session Description Protocol", Network Working Group, Jul. 2006.

* cited by examiner

*Primary Examiner* — Ronald Abelson
(74) *Attorney, Agent, or Firm* — Rabin & Berdo, P.C.

(57) ABSTRACT

The present invention relates to a communications relay device placed between networks. The communications relay device includes a unit of translating a content of a call control packet flowing between the networks, a unit of storing translation information for translating a content of a data packet for each session, a unit of translating a data packet in accordance with the stored translation information, a unit of analyzing a content of a call control packet flowing between a first communication device placed in the first network and a communication device for call control and registering translation information, and a unit of associating two pieces of translation information generated based on call control packets relevant to a session between communication devices placed in the first network.

5 Claims, 7 Drawing Sheets

FIG.3A

| SESSION IDENTIFICATION NUMBER 201 | OPTIMIZATION IDENTIFICATION NUMBER 202 | FIRST NETWORK INFORMATION 211 | | | | SECOND NETWORK INFORMATION 221 | | | |
|---|---|---|---|---|---|---|---|---|---|
| | | TERMINAL INFORMATION 212 | | VIRTUAL TERMINAL INFORMATION 215 | | VIRTUAL TERMINAL INFORMATION 222 | | TERMINAL INFORMATION 225 | |
| | | IP ADDRESS 213 | PORT NUMBER 214 | IP ADDRESS 216 | PORT NUMBER 217 | IP ADDRESS 223 | PORT NUMBER 224 | IP ADDRESS 226 | PORT NUMBER 227 |
| 1 | 2 | 10.0.0.10 | 10000 | 10.0.0.1 | 40001 | 20.0.0.1 | 20000 | 20.0.0.1 | 20001 |
| 2 | 1 | 10.0.0.20 | 30000 | 10.0.0.1 | 40000 | 20.0.0.1 | 20001 | 20.0.0.1 | 20000 |

FIG.3B

| SESSION IDENTIFICATION NUMBER 201 | OPTIMIZATION IDENTIFICATION NUMBER 202 | FIRST NETWORK INFORMATION 211 | | | | SECOND NETWORK INFORMATION 221 | | | |
|---|---|---|---|---|---|---|---|---|---|
| | | TERMINAL INFORMATION 212 | | VIRTUAL TERMINAL INFORMATION 215 | | VIRTUAL TERMINAL INFORMATION 222 | | TERMINAL INFORMATION 225 | |
| | | IP ADDRESS 213 | PORT NUMBER 214 | IP ADDRESS 216 | PORT NUMBER 217 | IP ADDRESS 223 | PORT NUMBER 224 | IP ADDRESS 226 | PORT NUMBER 227 |
| 1 | 0 | 10.0.0.10 | 10000 | 10.0.0.1 | 40000 | 20.0.0.1 | 20000 | 20.0.0.1 | 30000 |

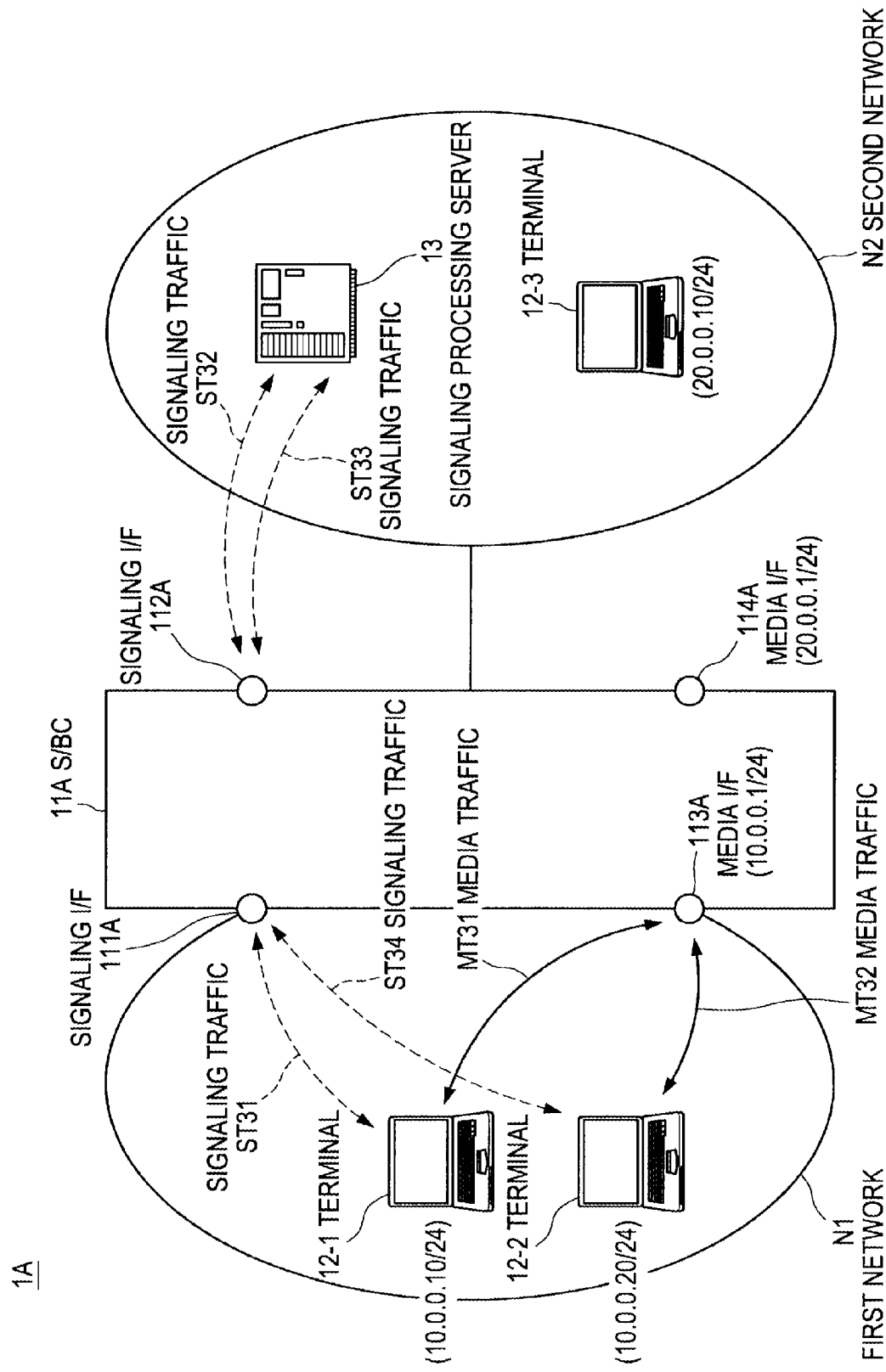

COMMUNICATIONS RELAY DEVICE, PROGRAM AND METHOD, AND NETWORK SYSTEM

BACKGROUND OF THE INVENTION

1. Field of the Invention

The present invention relates to a communications relay device, program and method, and a network system, and the present invention is applicable to a network system that includes a session/border controller (hereinafter referred to as "S/BC"), which is a device placed for connection between different networks, for example.

2. Description of the Related Art

One of functions for a media traffic which are required for the S/BC is NA(P)T (Network Address (Port) Translation) control function (cf. "ITU-T Y.2111 9.2, "Procedures for NAPT control and NAT traversal"").

The NA(P)T control function is a function of concealing a network at the other end of connection from each terminal by assigning an end IP address (or port) of media in each network as a virtual IP address (or port) to both of a network inside the S/BC (on the installation side) and a network outside the S/BC (on the counter connection side) when establishing a session by signaling between terminals to be connected, changing a message in signaling to the virtual IP address (or port) and transferring the message to the both terminals to be connected, so that each terminal transmits a media (data) traffic with the virtual IP address (or port) as a designation address.

Hereinafter, an example of a network system is described in the case where the related art disclosed in "ITU-T Y.2012, "Supplement 1, Session/border control (S/BC) functions", "ITU-T Y.2111 9.2, "Procedures for NAPT control and NAT traversal"", "IETF RFC3022, "Traditional IP Network Address Translator"", "IETF RFC3261, "SIP: Session Initiation Protocol"", "IETF RFC4566, "SDP: Session Description Protocol"" is applied as it is.

FIG. 6 is an explanatory view showing an overall configuration of a network system 1A according to related art.

An S/BC 11A is a device that executes the NA(P)T control function between different networks.

A first network N1 is a network on the installation side (inside) of the S/BC 11A, and it is a network employing TCP/IP, in which the S/BC 11A is installed.

A second network N2 is a network on the counter connection side (outside) of the S/BC 11A, and it is a network employing TCP/IP, which is connected through the S/BC 11A.

A signaling I/F 111A is an IP interface for transmission and reception of a signaling traffic which is provided to the first network N1 by the S/BC 11A. A signaling I/F 112A is an IP interface for transmission and reception of a signaling traffic which is provided to the second network N2 by the S/BC 11A. A media I/F 113A is an IP interface for transmission and reception of a media traffic which is provided to the first network N1 by the S/BC 11A. A media I/F 114A is an IP interface for transmission and reception of a media traffic which is provided to the second network N2 by the S/BC 11A. The signaling I/F 111A and the media I/F 113A may be the same interface. Further, the signaling I/F 112A and the media I/F 114A may be the same interface.

A terminal 12-1 and a terminal 12-2 are user interfaces for a service such as VoIP which is connected to the first network N1, and they are terminal devices that control connection or release of a media session by a signaling protocol such as SIP (Session Initiation Protocol; cf. "IETF RFC3261, "SIP: Session Initiation Protocol""). A terminal 12-3 is a terminal which is connected to the second network N2 and has the same structure as the terminal 12-1 and the terminal 12-2.

A signaling processing server 13 is a server that manages the terminals and performs call control by processing or relay of signaling which is required by each terminal.

A signaling traffic ST21 is a flow of a signaling packet which is transmitted and received between the terminal 12-1 and the S/BC 11A. A signaling traffic ST22 is a flow of a signaling packet which is transmitted and received between the S/BC 11A and the signaling processing server 13. A signaling traffic ST23 is a flow of a signaling packet which is transmitted and received between the signaling processing server 13 and the terminal 12-3. A media traffic MT21 is a flow of a media packet which is transmitted and received between the terminal 12-1 and the S/BC 11A. A media traffic MT22 is a flow of a media packet which is transmitted and received between the S/BC 11A and the terminal 12-3.

An example of an operation when making an IP telephone call from the terminal 12-1 (IP address: 10.0.0.10/24, port number: 10000) to the terminal 12-3 (IP address: 20.0.0.10/24, port number: 30000), where SIP and SDP (Session Description Protocol; cf. "IETF RFC4566, "SDP: Session Description Protocol"") are used as signaling protocols, bidirectional NAPT (IETF RFC3022, "Traditional IP Network Address Translator") is applied to a media traffic, and an IP address of the media I/F 113A is 10.0.0.1/24, a virtual port number range of the media I/F 113A is 40000 to 40009, an IP address of the media I/F 114A is 20.0.0.1/24, and a virtual port number range of the media I/F 114A is 20000 to 20009, is described hereinafter with reference to FIG. 6.

First, it is assumed that an INVITE message (the signaling traffic ST21) designated to the terminal 12-3 is transmitted from the terminal 12-1 to the S/BC 11A.

Next, the S/BC 11A allocates a port number not in use for a media session to the media I/F 114A as a virtual port number, changes the IP address of the terminal 12-1 which is designated by a connection IP address item in a connection data line of SDP in the INVITE message to the IP address of the media I/F 114A as a virtual IP address, changes a port number in a media description line of SDP to the allocated virtual port number, and transmits the INVITE message to the signaling processing server 13.

Then, the signaling processing server 13 identifies the terminal 12-3 from a designation identifier which is described in the INVITE message and transmits the INVITE message to the terminal 12-3.

The terminal 12-3 receives the INVITE message and, if a condition to enable a conversation is fulfilled, the terminal 12-3 transmits a "200 OK" message to the signaling processing server 13.

Then, the signaling processing server 13 determines a transfer route from the "200 OK" message and transmits the "200 OK" message to the S/BC 11A.

The S/BC 11A then allocates a port number not in use for a media session to the media I/F 113A as a virtual port number, changes the IP address of the terminal 12-3 which is designated by a connection IP address item in a connection data line of SDP in the "200 OK" message to the IP address of the media I/F 113A as a virtual IP address, changes a port number of a media description line of SDP to the allocated virtual port number, and transmits the "200 OK" message to the terminal 12-1.

The terminal 12-1 receives the "200 OK" message, and if a condition to enable a conversation is fulfilled, it transmits an ACK message to the terminal 12-3, so that the terminal 12-1 and the terminal 12-3 become the state during a telephone conversation. Transmission of the ACK message is the same as transmission of the INVITE message except that change to the virtual IP address and the virtual port number is not made.

By the above-described operation, a network at the other end of connection can be concealed from each terminal without interfering with the continuity of the media session.

SUMMARY OF THE INVENTION

However, the S/BC according to related art which is described above with reference to FIG. 6 has an issue that, in the NA(P)T control function, transfer of a media traffic is not capable if a call connection between terminals in the first network N1 is made in the configuration where the signaling processing server 13 that performs signaling relay is located in the second network N2.

FIG. 7 is an explanatory view showing the state where a call connection between terminals in the first network N1 is made.

A signaling traffic ST31 is a flow of a signaling packet which is transmitted and received between the terminal 12-1 and the S/BC 11A. A signaling traffic ST32 is a flow of a signaling packet (relevant to the terminal 12-1) which is transmitted and received between the S/BC 11A and the signaling processing server 13. A signaling traffic ST33 is a flow of a signaling packet (relevant to the terminal 12-2) which is transmitted and received between the S/BC 11A and the signaling processing server 13. A signaling traffic ST34 is a flow of a signaling packet which is transmitted and received between the S/BC 11A and the terminal 12-2. A media traffic MT31 is a flow of a media packet which is transmitted and received between the terminal 12-1 and the S/BC 11A. A media traffic MT32 is a flow of a media packet which is transmitted and received between the S/BC 11A and the terminal 12-2.

In FIG. 7, an operation when making an IP telephone call from the terminal 12-1 (IP address: 10.0.0.10/24, port number: 10000) to the terminal 12-2 (IP address: 10.0.0.10/24, port number: 30000), where SIP and SDP are used as signaling protocols, bidirectional NAPT is applied to a media traffic, and an IP address of the media I/F 113A is 10.0.0.1/24, a virtual port number range of the media I/F 113A is 40000 to 40009, an IP address of the media I/F 114A is 20.0.0.1/24, and a virtual port number range of the media I/F 114A is 20000 to 20009, is described.

As shown in FIG. 7, in the case where a call connection between terminals in the first network N1 is about to be made, the operation is the same as the above-described operation shown in FIG. 6 except that each of the INVITE message and the "200 OK" message of signaling passes through the S/BC 11A twice and that the allocated virtual IP address and virtual port number are different. However, the S/BC 11A is incapable of distinguishing between an INVITE message transmitted from the terminal 12-1 to the S/BC 11A at the time of an outgoing call from the terminal 12-1 and an INVITE message transmitted from the signaling processing server 13 to the S/BC 11A at the time of an incoming call to the terminal 12-2. Therefore, those two messages are recognized as being in different sessions. Then, even if a signaling traffic is normally transmitted and received and transmission and reception of a media traffic is started between the terminal 12-1 and the terminal 12-2, a designation IP address is the IP address of the media I/F 114A of the S/BC 11A in both the media traffic MT31 (RTP packet) transmitted from the terminal 12-1 and the media traffic MT32 (RTP packet) transmitted from the terminal 12-2, and because the packets transmitted from the media I/F 114A cannot be received by the same interface, an issue is raised that a media traffic cannot be transmitted and received between terminals.

Therefore, in a network system including a communications relay device (e.g. S/BC) placed between a first network and a second network and a call control device (e.g. signaling processing server) placed in the second network, it is desirable to achieve communication between terminals placed in the first network.

According to first embodiment of the present invention, there is provided A communications relay device constituting a network system including (1) a plurality of first NW communication devices belonging to a first network, a second NW communication device for call control belonging to a second network with a different architecture of identification information from the first network, and the communications relay device that relays packet communications between the first network and the second network, including, (2) a call control packet translation unit that, upon receiving a call control packet from the first NW communication device or the second NW communication device, rewrites identification information of a transmission source and a destination described in the call control packet into identification information in a destination network and transmits the translated call control packet, (3) a data packet translation information storage unit that stores data packet translation information for translating identification information of a transmission source and a destination of a data packet supplied from the first NW communication device or the second NW communication device to the communications relay device into identification information in a destination network in association with a session relevant to the data packet, (4) a data packet translation unit that, upon supply of a data packet from the first NW communication device to the communications relay device, searches for data packet translation information relevant to the data packet as a translation target, and rewrites identification information of a transmission source and a destination described in the translation target data packet into identification information in a destination network in accordance with the detected data packet translation information and transmits the translated data packet, (5) a translation information generation unit that, based on a result of analyzing a content of a call control packet serving as a translation target in the call control packet translation unit and flowing between a first first NW communication device and the second NW communication device for call control, generates data packet translation information of a session to be established between the first first NW communication device and the second NW communication device as a communication partner of the first first NW communication device and registers the generated data packet translation information into the data packet translation information storage unit, and (6) an association registration unit that, when an outgoing call is made from a first NW communication device at a calling end to a first NW communication device at a called end, performs registration to associate first data packet translation information generated based on a call control packet flowing between the first NW communication device at the calling end and the second NW communication device for call control with second data packet translation information generated based on a call control packet flowing between the first NW communication device at the called end and the second NW communication device for call control, out of translation information stored in the translation information storage unit, as data packet translation information relevant to one session in the data packet translation information storage unit.

According to second embodiment of the present invention, there is provided A communications relay program causing a computer incorporated in a communications relay device constituting a network system including (1) a plurality of first NW communication devices belonging to a first network, a second NW communication device for call control belonging to a second network with a different architecture of identification information from the first network, and the communications relay device that relays packet communications between the first network and the second network to implement functions including, (2) a call control packet translation unit that, upon receiving a call control packet from the first NW communication device or the second NW communication device, rewrites identification information of a transmission source and a destination described in the call control packet into identification information in a destination network and transmits the translated call control packet, (3) a data packet translation information storage unit that stores data packet translation information for translating identification information of a transmission source and a destination of a data packet supplied from the first NW communication device to the communications relay device into identification information in a destination network in association with a session relevant to the data packet, (4) a data packet translation unit that, upon supply of a data packet from the first NW communication device to the communications relay device, searches for data packet translation information relevant to the data packet as a translation target, and rewrites identification information of a transmission source and a destination described in the translation target data packet into identification information in a destination network in accordance with the detected data packet translation information and transmits the translated data packet, (5) a translation information generation unit that, based on a result of analyzing a content of a call control packet serving as a translation target in the call control packet translation unit and flowing between a first first NW communication device and the second NW communication device for call control, generates data packet translation information of a session to be established between the first first NW communication device and the second NW communication device as a communication partner of the first first NW communication device and registers the generated data packet translation information into the data packet translation information storage unit; and (6) an association registration unit that, when an outgoing call is made from a first NW communication device at a calling end to a first NW communication device at a called end, performs registration to associate first data packet translation information generated based on a call control packet flowing between the first NW communication device at the calling end and the second NW communication device for call control with second data packet translation information generated based on a call control packet flowing between the first NW communication device at the called end and the second NW communication device for call control, out of translation information stored in the translation information storage unit, as data packet translation information relevant to one session in the data packet translation information storage unit.

According to third embodiment of the present invention, there is provided A communications relay method in a communications relay device constituting a network system including (1) a plurality of first NW communication devices belonging to a first network, a second NW communication device for call control belonging to a second network with a different architecture of identification information from the first network, and the communications relay device that relays packet communications between the first network and the second network, (2) the communications relay device including a call control packet translation unit, a data packet translation information storage unit, a data packet translation unit, a translation information generation unit and an association registration unit, the method including the steps of (3) upon receiving a call control packet from the first NW communication device or the second NW communication device, rewriting identification information of a transmission source and a destination described in the call control packet into identification information in a destination network and transmitting the translated call control packet by the call control packet translation unit, (4) storing data packet translation information for translating identification information of a transmission source and a destination of a data packet supplied from the first NW communication device to the communications relay device into identification information in a destination network in association with a session relevant to the data packet in the data packet translation information storage unit, (5) upon supply of a data packet from the first NW communication device or the second NW communication device to the communications relay device, searching for data packet translation information relevant to the data packet as a translation target, rewriting identification information of a transmission source and a destination described in the translation target data packet into identification information in a destination network in accordance with the detected data packet translation information and transmitting the translated data packet by the data packet translation unit, (6) based on a result of analyzing a content of a call control packet serving as a translation target in the call control packet translation unit and flowing between a first first NW communication device and the second NW communication device for call control, generating data packet translation information of a session to be established between the first first NW communication device and the second NW communication device as a communication partner of the first first NW communication device and registering the generated data packet translation information into the data packet translation information storage unit by the translation information generation unit; and (7) when an outgoing call is made from a first NW communication device at a calling end to a first NW communication device at a called end, performing registration to associate first data packet translation information generated based on a call control packet flowing between the first NW communication device at the calling end and the second NW communication device for call control with second data packet translation information generated based on a call control packet flowing between the first NW communication device at the called end and the second NW communication device for call control, out of translation information stored in the translation information storage unit, as data packet translation information relevant to one session in the data packet translation information storage unit by the association registration unit.

The network system according to the third embodiment of the present invention including (1) a plurality of first NW communication devices belonging to a first network, a second NW communication device for call control belonging to a second network with a different architecture of identification information from the first network, and a communications relay device that relays packet communications between the first network and the second network, in which (2) the communications relay device according to the first embodiment of the present invention is applied to the communications relay device.

According to the embodiments of the present invention described above, in a network system including a communications relay device (e.g. S/BC) placed between a first network and a second network and a call control device (e.g. signaling processing server) placed in the second network, it is possible to achieve communication between terminals placed in the first network.

BRIEF DESCRIPTION OF THE DRAWINGS

FIGS. 3A and 3B are explanatory views showing exemplary contents of a translation table according to an embodiment.

FIG. 7 is an explanatory view showing an operation as an issue in a network system according to related art.

DETAILED DESCRIPTION OF THE PREFERRED EMBODIMENTS

Figure 1:
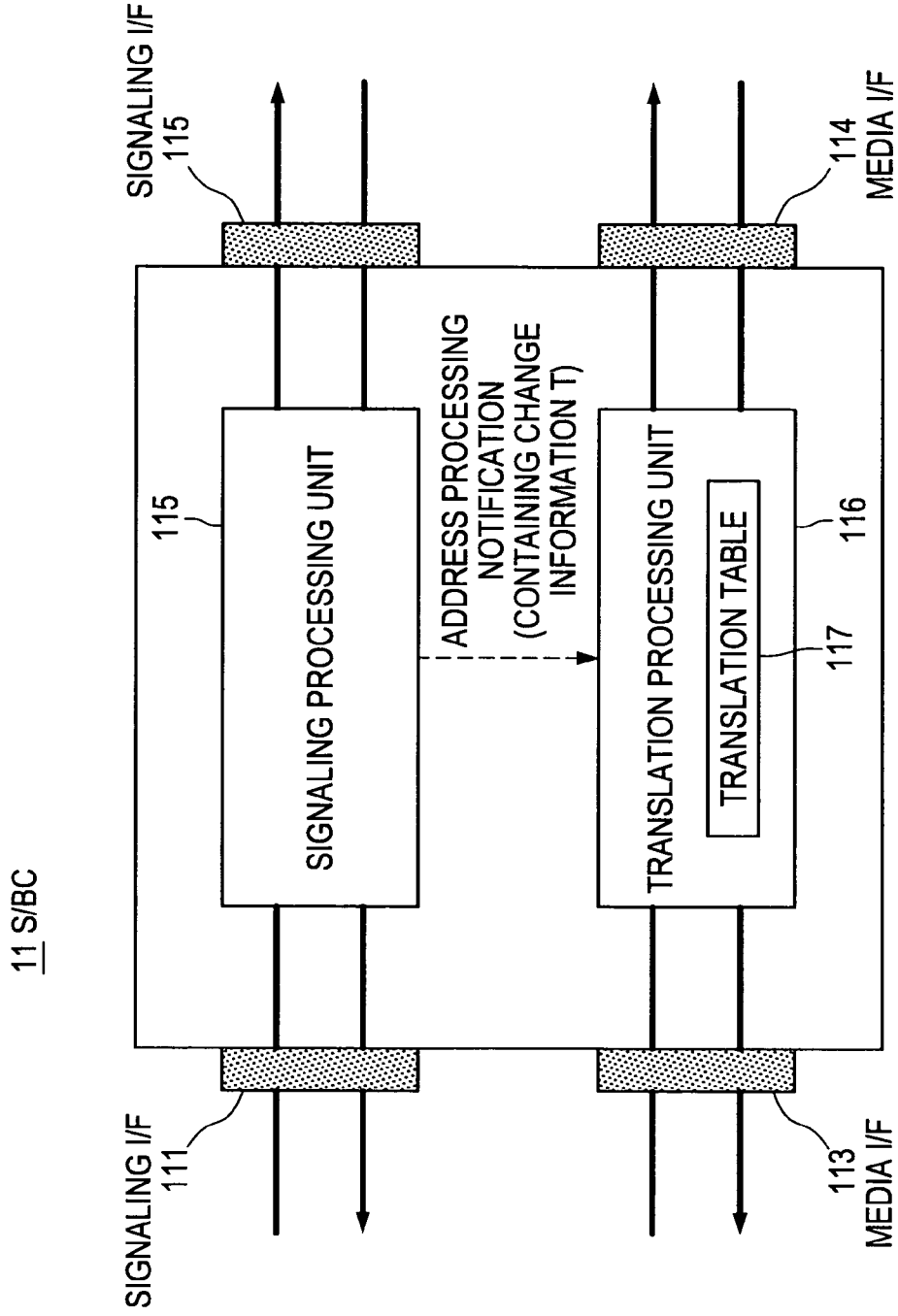
FIG. 1 is a block diagram showing a functional configuration of a session/border controller (communications relay device) according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(A) Principal Embodiment

A communications relay device, program and method, and a network system according to an embodiment of the present invention are described hereinafter in detail with reference to the drawings. In this embodiment, the case where a communications relay device according to the present invention is applied to an S/BC is described by way of illustration.

(A-1) Configuration According to Embodiment

Figure 2:
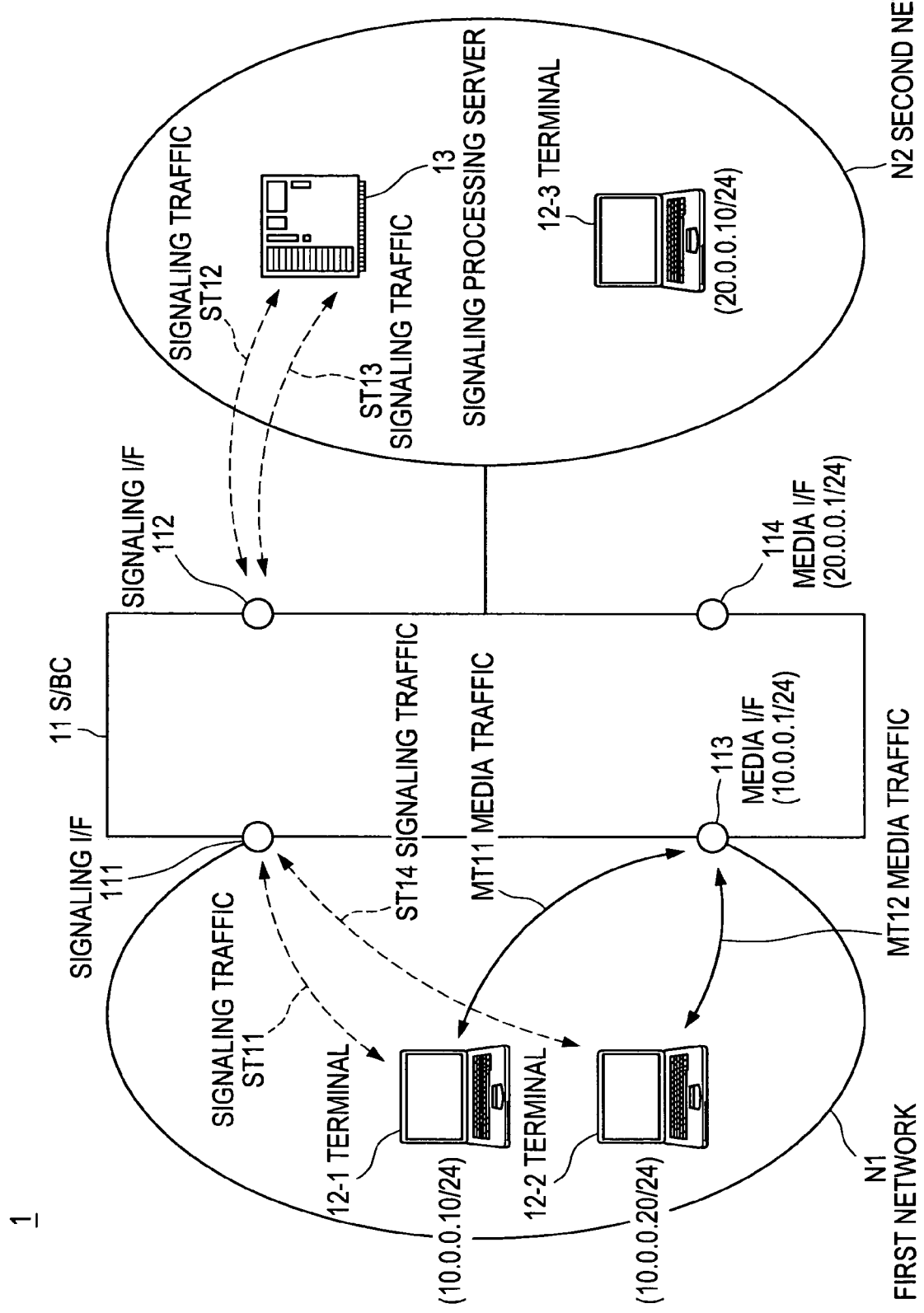
FIG. 2 is an explanatory view showing an overall configuration of a network system according to an embodiment.
Figure 6:
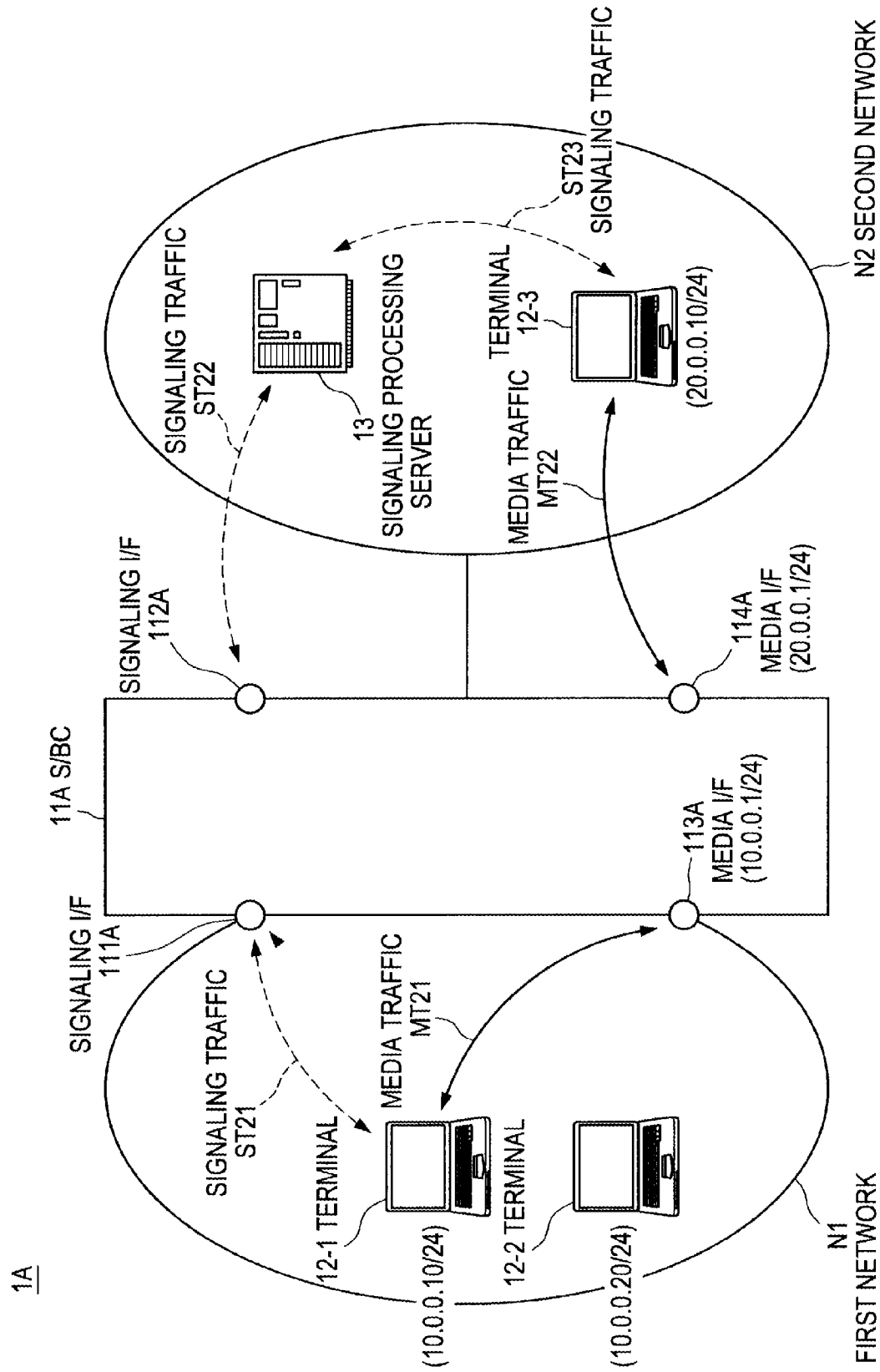
FIG. 6 is an explanatory view showing an overall configuration of a network system according to related art.

FIG. 2 is an explanatory view showing connections of an S/BC 11 (communications relay device) according to the embodiment and related devices. In FIG. 2, the same or corresponding elements as in FIGS. 6 and 7 are denoted by the same or corresponding symbols.

For a first network N1, a second network N2, terminals 12-1 to 12-3, a signaling processing server 13, the same elements as in FIG. 7 described earlier may be used. Further, the terminals 12-1 to 12-3 may not be terminals but may be substituted for communication devices under which nodes are disposed, such as IP-PBX, for example.

The S/BC 11 is a device that executes the NA(P)T control function between different networks.

FIG. 1 is a block diagram showing a functional configuration inside the S/BC 11 according to the embodiment. In FIG. 1, the same or corresponding elements as in FIG. 2 described earlier are denoted by the same or corresponding symbols. The S/BC 11 includes, other than a hardware-configured communication unit, a CPU, ROM, RAM or the like for executing communication processing, data processing (NA(P)T control) and so on, and a program to be executed by the CPU (including a communications relay program according to the embodiment) is installed, for example. The functional configuration of the S/BC 11, including the above-described program, is as shown in FIG. 1.

The S/BC 11 includes signaling I/F 111 and 112, media I/F 113 and 114, a signaling processing unit 115, a translation processing unit 116, and a translation table 117.

The signaling I/F 111 is an IP interface for transmission and reception of a signaling traffic which is provided to the first network N1 by the S/BC 11. The signaling I/F 112 is an IP interface for transmission and reception of a signaling traffic which is provided to the second network N2 by the S/BC 11. The media I/F 113 is an IP interface for transmission and reception of a media traffic which is provided to the first network N1 by the S/BC 11. The media I/F 114 is an IP interface for transmission and reception of a media traffic which is provided to the second network N2 by the S/BC 11.

The signaling I/F 111 and the media I/F 113 may be the same interface. Further, the signaling I/F 112 and the media I/F 114 may be the same interface.

A signaling traffic ST11 is a flow of a signaling packet which is transmitted and received between the terminal 12-1 and the S/BC 11.

A signaling traffic ST12 is a flow of a signaling packet (a packet whose transmission source or destination is the terminal 12-1 in signaling processing) which is transmitted and received between the S/BC 11 and the signaling processing server 13. A signaling traffic ST13 is a flow of a signaling packet (a packet whose transmission source or destination is the terminal 12-2 in signaling processing) which is transmitted and received between the S/BC 11 and the signaling processing server 13. A signaling traffic ST14 is a flow of a signaling packet which is transmitted and received between the S/BC 11 and the terminal 12-2.

A media traffic MT11 is a flow of a media packet which is transmitted and received between the terminal 12-1 and the S/BC 11. A media traffic MT12 is a flow of a media packet which is transmitted and received between the S/BC 11 and the terminal 12-2.

The signaling processing unit 115 has a function of analyzing a signaling message of a received signaling packet, changing an IP address and a port number, and transferring it to an interface for transmission. In the signaling processing unit 115, the configuration of translating a signaling packet and transmitting it to a destination may be the same as that of the S/BC according to related art shown in FIGS. 6 and 7.

When a signaling packet (signaling message) is changed in the signaling processing unit 115, information T about the change (which is referred to hereinafter as "change information T") is notified to the translation processing unit 116. The change information T contains a session identification number uniquely assigned in signaling processing, a type of a network received (the first network or the second network), an IP address and a port number in the signaling message (terminal information), and a virtual IP address and a virtual port number allocated by the S/BC 11 (virtual terminal information). In the signaling processing unit 115, the change information T may be extracted from the contents of SDP in a signaling packet (signaling message), as in the above-described S/BC shown in FIGS. 6 and 7.

The translation processing unit 116 has a function of executing translation of an IP address and a port number according to the contents of the translation table 117 by using an interface which has received an IP packet, a transmission source IP address of the received IP packet, a transmission source port number, a destination IP address, a destination port number and a protocol in the media traffic and then transferring it to an interface for transmission. Further, the translation processing unit 116 updates the contents of the translation table 117 based on the change information T received from the signaling processing unit 115.

FIGS. 3A and 3B are explanatory views showing examples of the contents of the translation table 117.

FIG. 3A shows an example of the contents of the translation table 117 in the case where a session is established between the terminal 12-1 and the terminal 12-2.

FIG. 3B shows an example of the contents of the translation table 117 according to the embodiment in the case where a session is established between the terminal 12-1 and the terminal 12-3 as in the example shown in FIG. 6 described earlier, although not shown in FIG. 2.

First network information 211 is made up of terminal information 212 and virtual terminal information 215 in the first network N1.

The terminal information 212 indicates an endpoint of a media session which is being used by a terminal existing in the first network N1 and contains information of an IP address 213 and a port number 214.

The IP address 213 is an IP address forming the endpoint of the media session.

The port number 214 is a port number forming the endpoint of the media session.

The virtual terminal information 215 indicates an endpoint of a virtual media session of a terminal existing in the second network N2 and contains information of an IP address 216 and a port number 217, which is allocated from an address space of the first network N1 by the S/BC 11.

The IP address 216 is an IP address forming the endpoint of the media session.

The port number 217 is a port number forming the endpoint of the media session.

Second network information 221 is made up of virtual terminal information 222 and terminal information 225 in the second network N2.

The virtual terminal information 222 indicates an endpoint of a virtual media session of a terminal existing in the second network N2 and contains information of an IP address 223 and a port number 224, which is allocated from an address space of the second network N2 by the S/BC 11.

The IP address 223 is an IP address forming the endpoint of the media session.

The port number 224 is a port number forming the endpoint of the media session.

The terminal information 225 indicates an endpoint of a media session which is being used by a terminal existing in the second network N2 and contains information of an IP address 226 and a port number 227.

The IP address 226 is an IP address forming the endpoint of the media session.

The port number 227 is a port number forming the endpoint of the media session.

An optimization identification number 202 indicates an identification number of a session relevant to its own session, and 0 is set when there is no relevant session. Specifically, when the optimization identification number 202 is a value different from "0", it means that information about one session is represented by two rows.

In the example of FIG. 3B, when an INVITE message is transmitted from the terminal 12-1 to the signaling processing server 13, an IP address of the terminal 12-1 which is designated by a connection IP address item in a connection data line of SDP in the message is set to the IP address 213, a port number in a media description line of SDP is set to the port number 214, an IP address of the media I/F 114 which is allocated as a virtual IP address is set to the IP address 223, and a port number not in use for a media session which is allocated as a virtual port number is set to the port number 224. After that, when a "200 OK" message is transmitted from the signaling processing server 13 to the terminal 12-1, an IP address of the terminal 12-3 which is designated by a connection IP address item in a connection data line of SDP in the message is set to the IP address 226, a port number in a media description line of SDP is set to the port number 227, an IP address of the media I/F 113 which is allocated as a virtual IP address is set to the IP address 216, and a port number not in use for a media session which is allocated as a virtual port number is set to the port number 217.

In the example of FIG. 3A, the row with a session identification number 201 of "1" is generated when an INVITE message which is outgoing from the terminal 12-1 to the terminal 12-2 is transmitted to the signaling processing server 13 and a "200 OK" message is transmitted from the signaling processing server 13 to the terminal 12-1. Further, the row with the session identification number 201 of "2" is generated when an INVITE message is transmitted from the signaling processing server 13 to the terminal 12-2 and further a "200 OK" message is transmitted from the terminal 12-1 to the signaling processing server 13. In the example of FIG. 3A, the contents of the first network information 211 and the second network information 221 are set in accordance with the contents of the INVITE message and the "200 OK" message as in the case of FIG. 3B described above, and therefore detailed explanation is omitted.

Further, in the example of FIG. 3A, the two rows are associated with each other with use of the session identification number 201 in the translation table 117, in such a way that the value of the optimization identification number 202 is "2" in the row with the session identification number 201 of "1", and the value of the optimization identification number 202 is "1" in the row with the session identification number 201 of "2". In the S/BC 11 (the translation processing unit 116), the two rows associated with each other are recognized as information relevant to one session. Note that, processing that detects the presence or absence of an item in which one session is represented by two rows in the translation table 117 and, upon detecting such rows, establishes an association between the rows by setting the value of the session identification number 201 of each row is referred to hereinafter as "optimization (processing)". The optimization processing is described in detail in explanation of the operation provided later. Information of the rows associated by the optimization processing in the translation table 117 is recognized as a session when an outgoing call is made from a terminal in the first network N1 to a terminal in the same first network N1 in the translation processing unit 116, and a media packet is transferred with use of the information in the two rows in a folded manner.

On the other hand, because one session can be represented in one row in the example of FIG. 3B, the optimization identification number 202 is 0.

In such a case, in the S/BC according to related art shown in FIG. 7 described earlier, an INVITE message from the terminal 12-1 to the signaling processing server 13 and an INVITE message from the signaling processing server 13 to the terminal 12-2 are only recognized as being relevant to separate sessions. In the S/BC 11 according to the embodiment, on the other hand, they are recognized as being relevant to one session as a result of establishing an association with use of the session identification number 201 in the translation table 117.

(A-2) Operation According to Embodiment

An operation of the S/BC 11 according to the embodiment which has the above-described configuration is described hereinbelow.

(A-2-1) Optimization Operation

First, an operation of registration of the contents of the translation table 117 and optimization processing in the S/BC 11 is described hereinafter.

Figure 4:
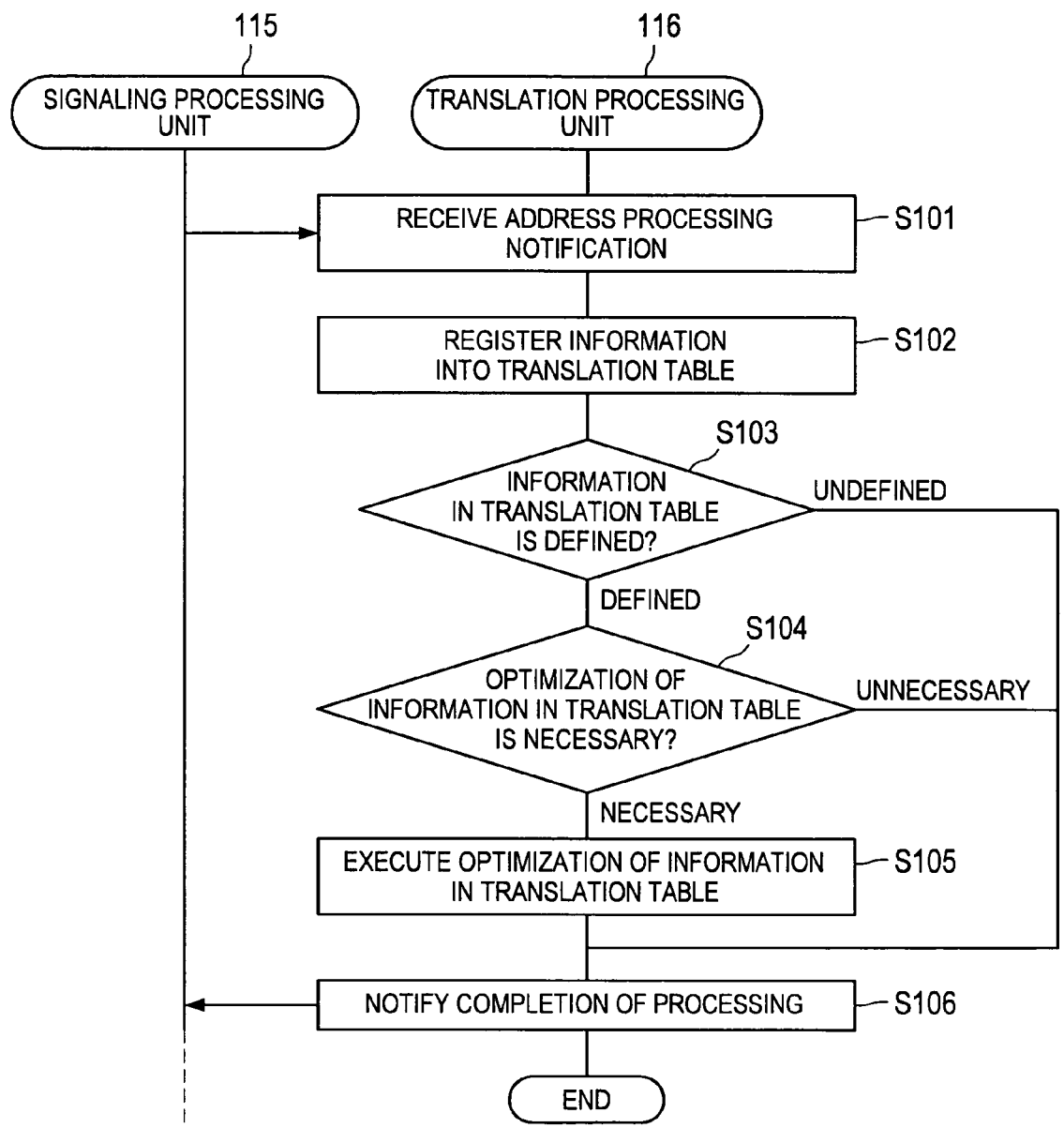
FIG. 4 is a flowchart showing an operation of optimization processing in a session/border controller (communications relay device) according to an embodiment.

FIG. 4 is a flowchart showing an operation of registration of the contents of the translation table 117 and optimization processing in the translation processing unit 116 shown in the functional configuration of the S/BC 11 in FIG. 1.

First, the translation processing unit 116 receives an address processing notification which contains the change information T from the signaling processing unit 115 (S101).

Next, the translation processing unit 116 registers the contents of the received change information T into the translation table 117. In the registration, a matching row is searched in the translation table 117 by using the session identification number of the change information T, and if the matching row exists, the information is registered in the row, and if it does not exist, the information is registered in a new row. The translation processing unit 116 selects the first network information 211 if the network type of the change information T is the first network and selects the second network information 221 if it is the second network, and then registers the terminal information of the change information T into the terminal information 212 or the terminal information 225 and registers the virtual terminal information of the change information T into the virtual terminal information 215 or the virtual terminal information 222 (S102).

Next, if both of the first network information 211 and the second network information 221 of a row (session) as a registration target have been registered, the translation processing unit 116 determines that IP address and port number translation information, is defined. On the other hand, if only either one of the first network information 211 and the second network information 221 has been registered, the translation processing unit 116 determines that the information is undefined (S103).

If it is determined in the step S103 that the translation table 117 is defined, the translation processing unit 116 then determines whether optimization is necessary (S104). In the step S104, it is determined that optimization is necessary when the IP address 223 of the virtual terminal information 222 and the IP address 226 of the terminal information 225 match, and it is determined that optimization is not necessary when they do not match. Although NAPT (port number translation) is used as a condition in the example of FIG. 3, determination may be made in the same manner in the case of using NAT (IP address translation). Specifically, identification information of a terminal in the S/BC 11 is not necessarily a combination of an IP address and a port, and only an IP address may be used as identification information.

If the translation processing unit 116 determines in the above-described step S104 that optimization is necessary, the optimization processing is executed on the translation table 117 (S105). The optimization processing in the step S105 is processing that searches for sessions to become a pair in optimization and establishes an association. Specifically, a row in which the IP address 223 and the port number 224 of the virtual terminal information 222 of the second network information 221 respectively match the IP address 226 and the port number 227 of the terminal information 225 of the second network information 221 in the row as a registration target is searched, and if such a row is found, the session identification number 201 of the retrieved row is set to the optimization identification number 202 of the registration target row, and the session identification number 201 of the registration target row is set to the optimization identification number 202 of the retrieved row. If, the other hand, such a row is not found, "0" indicating that there is no relation for optimization is set to the optimization identification number 202 of the registration target row, and the optimization processing is terminated.

Then, if the processing is completed, the translation processing unit 116 notifies completion of processing to the signaling processing unit 115 (S106).

The operation in the steps S101 to S106 described above is described specifically by taking the set values in the translation table 117 shown in FIG. 3A as an example. When the row with the session identification number of 1 has been registered and registration of the row with the session identification number of 2 is completed, search is executed with the IP address 226 (20.0.0.1) and the port number 227 (20000) of the terminal information 225 with the session identification number of 2, and the row with the session identification number of 1 which has the IP address 223 (20.0.0.1) and the port number 224 (20000) of the virtual terminal information 222 is retrieved, and 1 which is the retrieved session identification number is set to the optimization identification number 202 of the row with the session identification number of 2, and 2 which is the session identification number as a registration target is set to the optimization identification number 202 of the row with the session identification number of 1, thereby completing the optimization processing.

(A-2-2) Transfer Operation of Media Traffic

Next, an operation of translating an IP address and a port number of a received media packet and transferring it is described hereinbelow. Although a media packet is an RTP packet in the example of FIG. 5, it may replaced with a packet of another format.

Figure 5:
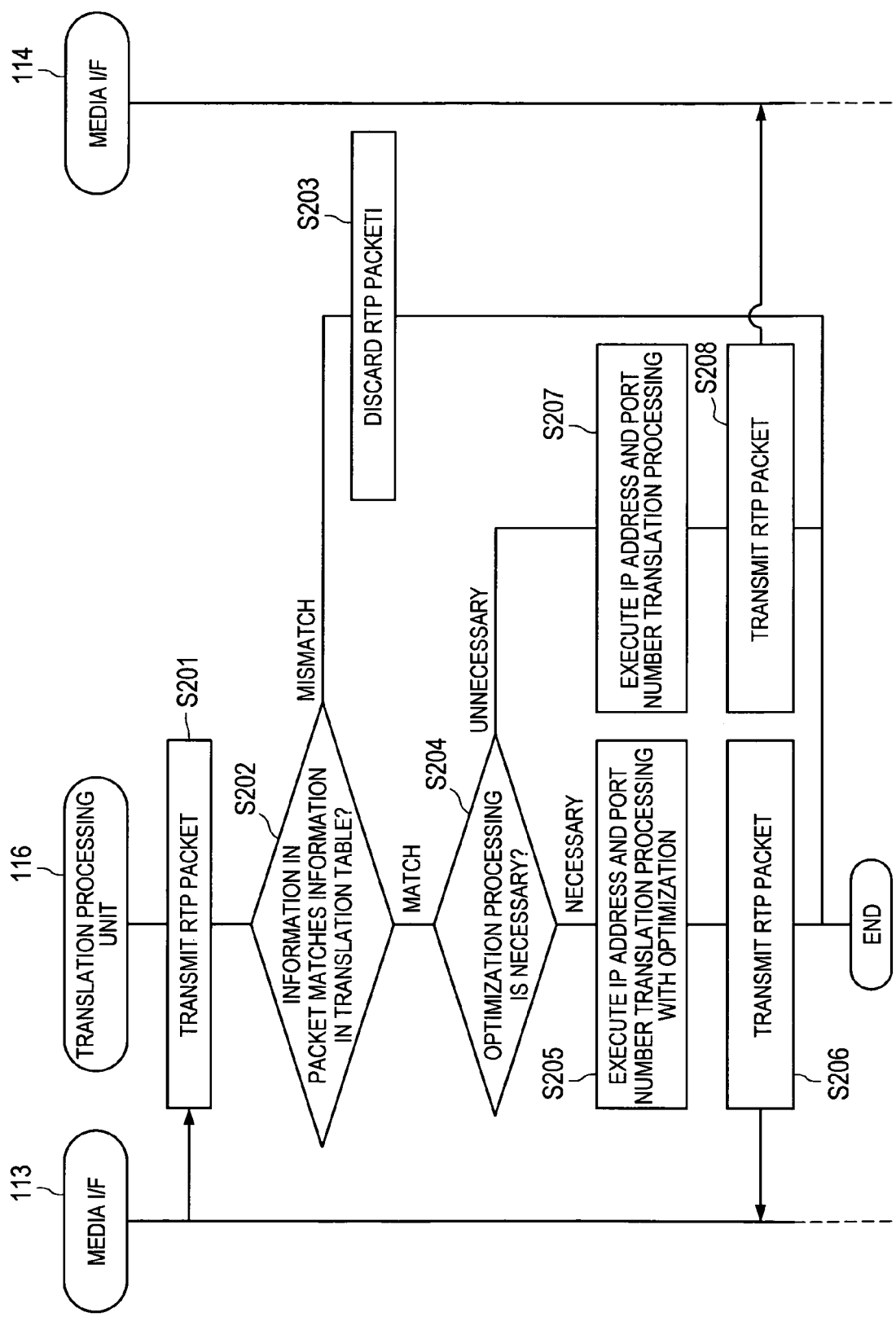
FIG. 5 is a flowchart showing an operation of media packet translation processing in a session/border controller (communications relay device) according to an embodiment.

FIG. 5 is a flowchart to describe an operation of translating an IP address and a port number of a received RTP packet and transferring it in the translation processing unit 116.

If the translation processing unit 116 receives an RTP packet (media packet) from the media I/F 113 (S201), the translation processing unit 116 extracts a transmission source IP address, a transmission source port number, a destination IP address and a destination port number from the received RTP packet, compares the extracted transmission source IP address with the IP address 213, the extracted transmission source port number with the port number 214, the extracted destination IP address with the IP address 216, and the extracted destination port number with the port number 217 respectively on the translation table 117, and searches for a row in which they all match. If the matching row is found, it is determined to be a match, and if the matching row is not found, it is determined to be a mismatch (S202).

If the matching row is not found on the translation table 117 in the above-described step S202, the translation processing unit 116 determines that the RTP packet out of a translation target has been received and discards the received RTP packet, thereby terminating the processing (S203).

If, on the other hand, the matching row is found on the translation table 117 in the above-described step S202, the translation processing unit 116 refers to the value of the optimization identification number 202 in the row detected from the translation table 117, and determines that the optimization processing is necessary if the value is different from 0 or that the optimization processing is unnecessary if the value is 0 (S204).

If the translation processing unit 116 determines in the above-described step S204 that the optimization processing is necessary, the translation processing unit 116 executes translation processing of an IP address and a port number with optimization on the received RTP packet (S205), and transmits the translated RTP packet to the media I/F 113 (S206).

In the above-described step S205, the translation processing unit 116 first selects the row with the session identification number 201 of the same value as the optimization identification number 202 in the row retrieved from the translation table 117 as translation information. Next, the translation processing unit 116 changes a transmission source IP address of the received RTP packet into the IP address 216 of the virtual terminal information 215 of the first network information 211 of the translation information. Further, the translation processing unit 116 changes a transmission source port number of the received RTP packet into the port number 217 of the virtual terminal information 215 of the first network information 211 of the translation information. Then, the translation processing unit 116 changes a destination IP address of the received RTP packet into the IP address 213 of the terminal information 212 of the first network information 211 of the translation information. Further, the translation processing unit 116 changes a destination port number of the received RTP packet into the port number 214 of the terminal information 212 of the first network information 211 of the translation information.

On the other hand, if the translation processing unit 116 determines in the above-described step S204 that the optimization processing is unnecessary, the translation processing unit 116 executes normal translation processing of an IP address and a port number without optimization on the received RTP packet (S207), and transmits the translated RTP packet to the media I/F 113 (S208).

In the above-described step S207, the translation processing unit 116 first executes normal IP address and port number translation processing on the received RTP packet. The translation processing unit 116 then selects the row retrieved from the translation table 117 as translation information. Next, the translation processing unit 116 changes a transmission source IP address of the received RTP packet into the IP address 223 of the virtual terminal information 222 of the second network information 221 of the translation information. Further, the translation processing unit 116 changes a transmission source port number of the received RTP packet into the port number 224 of the virtual terminal information 222 of the second network information 221 of the translation information. Then, the translation processing unit 116 changes a destination IP address of the received RTP packet into the IP address 226 of the terminal information 225 of the second network information 221 of the translation information. Further, the translation processing unit 116 changes a destination port number of the received RTP packet into the port number 227 of the terminal information 225 of the second network information 221 of the translation information.

(A-3) Advantage of Embodiment

According to the embodiment, the following advantage is obtained.

In the network system 1 that includes the S/BC 11 placed between the first network and the second network and the signaling processing server 13 placed in the second network N2, even if a call connection is made between terminals placed in the first network, a received media traffic can be transferred in a folded manner in the S/BC 11, so that media transfer can be executed normally between the terminals.

(B) Other Embodiments

The present invention is not limited to the above-described embodiment, and alternative embodiments are possible as described hereinafter by way of illustration.

(B-1) Although the case where the communications relay device according to the present invention is applied to the S/BC is described in the above-described embodiment, it is not necessarily applied to the S/BC, and it may be applied to another communications relay device (e.g. a router, a firewall, a gateway device, a proxy server etc.) that relays communications between communication devices.

(B-2) Although SIP is used for call control (signaling) in the above-described embodiment, another call control scheme (e.g. H.323 etc.) may be used instead.

Further, although an RTP packet is described as an example of a packet of a media traffic (a packet with data inserted which is transmitted between communication devices), another kind of packet such as RTCP (cf. IETF RFC1889), for example, may be used as long as it is a packet having data inserted which is transmitted between communication devices.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-034383 filed in the Japan Patent Office on Feb. 17, 2009, the entire content of which is hereby incorporated by reference.

What is clamed is:

1. A session/border controller configured to relay packet communications between a first network and a second network, wherein the first network includes a plurality of first network communication devices, the second network has a different architecture of identification information from the first network, and the second network includes a signal processing server configured to perform call control, the session/border controller further comprising:

a call control packet translation unit that, upon receiving a call control packet from a first network communication device of the plurality of first network communication devices or from the signal processing server, rewrites identification information of a transmission source and a destination described in the call control packet into identification information in a destination network and transmits the translated call control packet;

a data packet translation information storage unit that stores data packet translation information for translating identification information of a transmission source and a destination of a data packet supplied from the first network communication device or the signal processing server to the session/border controller into identification information in a destination network in association with a session relevant to the data packet;

a data packet translation unit that, upon supply of a data packet from the first network communication device to the session/border controller, searches for data packet translation information relevant to the data packet as a translation target, and rewrites identification information of a transmission source and a destination described in the translation target data packet into identification information in a destination network in accordance with the detected data packet translation information and transmits the translated data packet;

a translation information generation unit that, based on a result of analyzing a content of a call control packet serving as a translation target in the call control packet translation unit and flowing between the first network communication device and the signal processing server, generates data packet translation information of a session to be established between the first network communication device and the signal processing server as a communication partner of the first network communication device and registers the generated data packet translation information into the data packet translation information storage unit; and an association registration unit that, when an outgoing call is made from a calling first network communication device at a calling end to a called first network communication device at a called end, performs registration to associate first data packet translation information generated based on a call control packet flowing between the calling first network communication device at the calling end and the signal processing server with second data packet translation information generated based on a call control packet flowing between the called first network communication device at the called end and the signal processing server, out of translation information stored in the translation information storage unit, as data packet translation information relevant to one session in the data packet translation information storage unit.

2. The communications relay device according to claim 1, wherein
when associated data packet translation information associated by the association registration unit exists in the data packet translation information relevant to the translation target data packet, the data packet translation unit recognizes that a destination of the translation target data packet is another first network communication device, performs translation with use of the data packet translation information relevant to the translation target data packet and the associated data packet translation information, and transmits the translated data packet to said another first network communication device.

3. A non-transitory computer readable medium with an executable program stored thereon, where the program instructs a computer incorporated in a session/border controller configured to relay packet communications between a first network and a second network, wherein the first network includes a plurality of first network communication devices, the second network has a different architecture of identification information from the first network, and the second network includes a signal processing server configured to perform call control, the program being configured to implement functions comprising:

a call control packet translation unit that, upon receiving a call control packet from a first network communication device of the plurality of first network communication devices or from the signal processing server, rewrites identification information of a transmission source and a destination described in the call control packet into identification information in a destination network and transmits the translated call control packet;

a data packet translation information storage unit that stores data packet translation information for translating identification information of a transmission source and a destination of a data packet supplied from the first network communication device or from the signal processing server to the session/border controller into identification information in a destination network in association with a session relevant to the data packet;

a data packet translation unit that, upon supply of a data packet from the first network communication device to the session/border controller, searches for data packet translation information relevant to the data packet as a translation target, and rewrites identification information of a transmission source and a destination described in the translation target data packet into identification information in a destination network in accordance with the detected data packet translation information and transmits the translated data packet;

a translation information generation unit that, based on a result of analyzing a content of a call control packet serving as a translation target in the call control packet translation unit and flowing between the first network communication device and the signal processing server, generates data packet translation information of a session to be established between the first network communication device and the signal processing server as a communication partner of the first network communication device and registers the generated data packet translation information into the data packet translation information storage unit; and an association registration unit that, when an outgoing call is made from a calling first network communication device at a calling end to a called first network communication device at a called end, performs registration to associate first data packet translation information generated based on a call control packet flowing between the calling first network communication device at the calling end and the signal processing server with second data packet translation information generated based on a call control packet flowing between the called first network communication device at the called end and the signal processing server, out of translation information stored in the translation information storage unit, as data packet translation information relevant to one session in the data packet translation information storage unit.

4. A communications relay method employing a session/border controller in a network system having a first network including a plurality of first network communication devices a second network with a different architecture of identification information from the first network, the second network including a signal processing server configured to perform call control, the session/border controller configured to relay packet communications between the first network and the second network, the session/border controller including a call control packet translation unit, a data packet translation information storage unit, a data packet translation unit, a translation information generation unit and an association registration unit, the method comprising the steps of:

upon receiving a call control packet from the first network communication device or the signal processing server, rewriting identification information of a transmission source and a destination described in the call control packet into identification information in a destination network and transmitting the translated call control packet by the call control packet translation unit;

storing data packet translation information for translating identification information of a transmission source and a destination of a data packet supplied from the first network communication device to the session/border controller into identification information in a destination network in association with a session relevant to the data packet in the data packet translation information storage unit;

upon supply of a data packet from the first network communication device or the signal processing server to the session/border controller, searching for data packet translation information relevant to the data packet as a translation target, rewriting identification information of a transmission source and a destination described in the translation target data packet into identification information in a destination network in accordance with the detected data packet translation information and transmitting the translated data packet by the data packet translation unit;

based on a result of analyzing a content of a call control packet serving as a translation target in the call control packet translation unit and flowing between the first network communication device and the signal processing server, generating data packet translation information of a session to be established between the first network communication device and the signal processing server as a communication partner of the first network communication device and registering the generated data packet translation information into the data packet translation information storage unit by the translation information generation unit; and when an outgoing call is made from a calling first network communication device at a calling end to a called first network communication device at a called end, performing registration to associate first data packet translation information generated based on a call control packet flowing between the calling first network communication device at the calling end and the signal processing server with second data packet translation information generated based on a call control packet flowing between the called first network communication device at the called end and the signal processing server, out of translation information stored in the translation information storage unit, as data packet translation information relevant to one session in the data packet translation information storage unit by the association registration unit.

5. A network system comprising a first network including a plurality of first network communication devices and a second network including a signal processing server configured to perform call control, the second network having a different architecture of identification information from the first network, and a session/border controller configured to relay packet communications between the first network and the second network, wherein the session/border controller according to claim 1 is employed as the session/border controller.

* * * * *